(12) United States Patent
Yoo et al.

(10) Patent No.: US 8,727,930 B2
(45) Date of Patent: May 20, 2014

(54) FORCED SPEED CHANGING APPARATUS OF BICYCLE

(75) Inventors: Hyuk Yoo, Cheongju (KR); Tae-Jin Jung, Cheongju (KR); Seong-Cheol An, Cheongju (KR)

(73) Assignee: MBI Co., Ltd., Cheongju (KR)

( * ) Notice: Subject to any disclaimer, the term of this patent is extended or adjusted under 35 U.S.C. 154(b) by 356 days.

(21) Appl. No.: 13/023,718

(22) Filed: Feb. 9, 2011

(65) Prior Publication Data

US 2011/0195813 A1 Aug. 11, 2011

(30) Foreign Application Priority Data

Feb. 9, 2010 (KR) .................. 10-2010-0012124

(51) Int. Cl.
*F16H 3/44* (2006.01)
(52) U.S. Cl.
USPC .......................................................... 475/297
(58) Field of Classification Search
None
See application file for complete search history.

(56) References Cited

U.S. PATENT DOCUMENTS

| | | | |
|---|---|---|---|
| 5,540,456 | A | 7/1996 | Meier-Burkamp et al. |
| 6,478,711 | B2 | 11/2002 | Yoo |
| 2001/0019982 | A1 | 9/2001 | Yoo |

FOREIGN PATENT DOCUMENTS

| | | | |
|---|---|---|---|
| JP | 05-065093 | A | 3/1993 |
| JP | 05065093 | A | 3/1993 |
| JP | 10-096453 | A | 4/1998 |
| KR | 1020010060305 | A | 7/2001 |
| KR | 1020070121723 | A | 12/2007 |
| RU | 02250174 | C2 | 4/2005 |
| WO | WO 2006/135213 | A1 | 12/2006 |

*Primary Examiner* — Erin D Bishop

(57) ABSTRACT

Provided is a forced speed changing apparatus of bicycle. The forced speed changing apparatus of bicycle is characterized in that a pressure member is disposed at the pawl controlling ring 15, and a spline groove 27, 27a and 27b is formed at an inner circumference of the carrier 20 so that the pressure member is moved by rotation of the carrier 20 so as to press the pawl 12, 13 and to release engagement between the pawl 12, 13 and the sun gear 23, 24. Therefore the function and operation of the forced speed changing apparatus of bicycle can be enhanced.

10 Claims, 21 Drawing Sheets

FORCED SPEED CHANGING APPARATUS OF BICYCLE

CROSS-REFERENCE(S) TO RELATED APPLICATIONS

The present invention claims priority of Korean Patent Application No. 10-2010-0012124, filed on Feb. 9, 2010, which is incorporated herein by reference.

BACKGROUND OF THE INVENTION

1. Field of the Invention

The present invention relates to a speed changing apparatus of bicycles, and particularly to a speed changing apparatus of bicycles, which assists gear shifting operation of the apparatus disposed in a rear wheel hub of the bicycle, thereby facilely shifting gears of the apparatus even with small force.

2. Description of Related Art

Generally, a bicycle run by force applied to a pedal has a speed changing apparatus in order to change rotational speed of wheels of the bicycle. As a speed changing apparatus of bicycles, there is an outer chain-type transmission including multiple sprockets which are disposed at a rear wheel and on which a chain is installed, and a derailer which selectively couples the chain with one of the sprockets.

In the outer chain-type transmission, there is a problem that the chain is frequently taken off from the sprockets during running of the bicycle and thus should be reinstalled on the sprockets. Herein, since lubricating oil such as grease is applied on the chain so that the chain can be facilely moved, the lubricating oil may be stained on rider's clothes, and the hands are also smeared with the lubricating oil while reinstalling the taken off chain. Further, in case that the rider is a woman or a child, it is difficult to reinstall the taken off chain on the sprocket.

In order to solve the problems in the outer chain-type transmission, there has been recently proposed an inner gear-type transmission which is disposed in the rear wheel hub. As an example of the inner gear-type transmission, there has been disclosed an apparatus for changing speed of bicycles (Korean Patent No. 10-0436697) which had proposed by the inventor.

The apparatus for changing speed of bicycles above-mentioned, as shown in FIG. 1, includes a driven sprocket 100 for receiving the driving force of a driving sprocket; a speed controlling portion including a carrier 210 fixed to one side of the driven sprocket 100 and having a plurality of planetary gears 220 installed thereon, two or more sun gears 231 and 232 each having ratchet-teeth being formed along its inner circumference, and a ring gear 240 engaged with the planetary gears 220; an output portion including a hub shell 310 for transferring driving force to a rear wheel of a bicycle by means of the carrier 210 and the ring gear 240, and clutch means 320 mounted between the carrier 210 and the hub shell 310 and the ring gear 240 and the hub shell 310 to selectively transmit the driving force; and a speed-changing controlling portion including a hub shaft 410 having a pawl positioning portion 411, two or more pawls 421 and 422 operative to be engaged with or disengaged from the ratchet-teeth of the two or more sun gears 231 and 232, a pawl-controlling ring 430 operative to control positions of the pawls 421 and 422, a transforming disk 450 having a groove for winding a wire along its outer circumference and a hooking portion on the outer circumference, the transforming disk being operative to transform a position of the pawl-controlling ring 430 via a mediating portion 440, a spring 460 for restoring a position of the transforming disk 450 to original position, and a spacing portion 470 for maintaining a space of the transforming disk 450.

And the wire installed at the hooking portion of the transforming disk 450 is connected with a lever (not shown) disposed at a handle.

When changing speed of the bicycle using the above-mentioned apparatus, the wire connected to the lever rotates the transforming disk by operation of the lever. And, the pawl controlling ring is rotated to a proper position, such that the pawl is engaged with the ratchet-teeth formed at the inner circumference of one of the sun gears so as to transmit the rotational force, and thus the planetary gear engaged with the outer circumference of the sun gear, thereby achieving the speed changing. Herein, if a larger sun gear is selected, the bicycle is in a high speed state, and if a small sun gear is selected, the bicycle is in a middle speed state, and if none of the sun gears is selected, the bicycle is in a low speed state.

Meanwhile, when an uphill road running is started while the bicycle is driven at high speed, lower gear ratio of the apparatus may be selected to reduce the speed of by bicycle so as to increase the rotation torque. At this time, following problems are occurred. That is, when trying to operate the lever and rotate the pawl to a deceleration position, since the pawl continuously pushes the ratchet teeth in a state of being strongly engaged with the ratchet teeth formed in the inner circumference of the sun gear, it is not easy to rotate the pawl controlling ring. Only after an excessive force to a degree that at least the pawl goes over an inclination surface of the ratchet teeth is applied, the gear shifting can be achieved.

When the bicycle is driven at the downhill road with less pedaling force, the engagement between the pawl and ratchet teeth is released and the gear shifting can be achieved with small force, and thus, though the shifting cannot be achieved due to strong pedaling force at the uphill road running, it does not matter much.

However, in case that the above-mentioned transmission is applied to an electrical bicycle in which an electric motor is utilized as a driving means, since strong force is always exerted between the pawl and the ratchet teeth which are engaged with each other, it is not easy to perform the gear shifting. Therefore, in case that the gear shifting is performed by operating an electrical device such as an electrical switch which generates relatively small driving force, it is further difficult to achieve the gear shifting.

Meanwhile, in Japanese Patent Publication No. Hei 10-96453, it is described that the gear shifting can be achieved even though the pawl is strongly engaged with the ratchet teeth of the sun gear. In the document disclosed, a small electric motor for controlling the gear shifting is provided so as to rotate the pawl. Herein, if rotational force for rotating the pawl is higher than output of the electric motor, wheel driving force derived from a driving force transferring portion is transferred to the pawl controlling ring, thereby achieving the shifting. Therefore, since the wheel driving force is actually used in the above-mentioned document though the small electric motor is used, it is hard on the components and also it loses part of the driving force. Further, since the mechanism for transferring the driving force from the driving force transferring portion to the pawl-controlling ring is so complicated, it is difficult to embody the mechanism actually.

SUMMARY OF THE INVENTION

An embodiment of the present invention is directed to providing a forced speed changing apparatus of bicycle, which can facilely and simply assist a speed changing operation of the apparatus.

To achieve the object of the present invention, the present invention provides a forced speed changing apparatus of bicycle including a hub shaft 10 on which a plurality of pawls 12 and 13 are mounted; a pawl controlling ring 15 which controls the pawls 12 and 13; a carrier 20 which is disposed outside the pawl controlling ring 15; a plurality of sun gears 23, 24 engaged with the hub shaft 10 by operation of the pawls 12, 13; a plurality of planetary gears 22 engaged with the sun gears 23, 24; a hub shell 30 which receives the carrier 20 and has a ring gear 31 engaged with the planetary gear 22; and a speed changing unit 50 which rotates the pawl controlling ring 15, wherein a pressure member is disposed at the pawl controlling ring 15, and a spline groove 27, 27a and 27b is formed at an inner circumference of the carrier 20 so that the pressure member is moved by rotation of the carrier 20 so as to press the pawl 12, 13 and to release engagement between the pawl 12, 13 and the sun gear 23, 24.

In another embodiment of the invention, only one first pawl 12 and/or only one second pawl 13 are provided in order to simplify the arrangement. In an advantageous embodiment of the invention, exactly two first pawls 12 and/or exactly two second pawls 13 are provided facilitating the load distribution.

Figure 1:
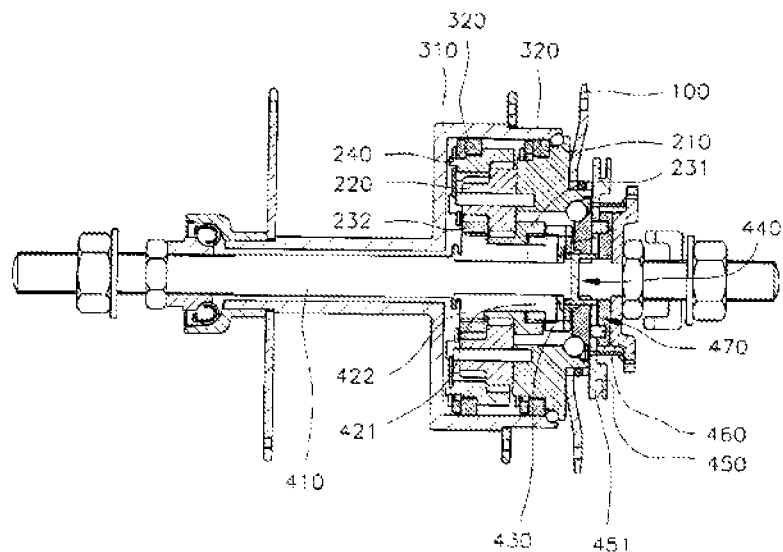
FIG. 1 is a cross-sectional view of a conventional speed changing apparatus of bicycles.

| [Detailed Description of Main Elements] | |
|---|---|
| 1: a forced speed changing apparatus of bicycle | |
| 10: hub shaft | 11: pawl mounting portion |
| 12: first pawl | 12a: first fixing pawl |
| 12b: first sagging pawl | |
| 12c: first connecting portion | |
| 13: second pawl | 13a: second fixing pawl |
| 13b: second sagging pawl | |
| 13c: second connecting portion | |
| 15: pawl controlling ring | 16: ring housing |
| 16a: first push protrusion | 16b: second push protrusion |
| 17: controlling bar | 18: mounting hole |
| 18a: protruding portion | 19: fixing ring |
| 19a: first push protrusion | 19b: second push protrusion |
| 20: carrier | 21: housing |
| 21a: sprocket mounting portion | |
| 22: planetary gear | 23: first sun gear |
| 23a: first gear part | 23b: first fixing protrusion |
| 24: second sun gear | 24a: second gear part |
| 24b: second fixing protrusion | |
| 25: ratchet member | 26: sprocket |
| 27, 27a, 27b: spline groove | |
| 28: transferring member | 29: spline groove body |
| 30: hub shell | 31: ring gear |
| 32: ratchet teeth | 40: cover |
| 50: speed changing unit | 60: supporting unit |
| B: pressure roller | B': pressure ball |
| S: spring | P: pin |

DESCRIPTION OF SPECIFIC EMBODIMENTS

The advantages, features and aspects of the present invention will become apparent from the following description of the embodiments with reference to the accompanying drawings, which is set forth hereinafter.

The present invention relates to a forced speed changing apparatus of bicycle 1, which can selectively apply pressing force to the pawl so as to forcibly release the engagement between the pawl and the sun gear, thereby solving the problem that it is difficult to change the speed because the pawl and the sun gear are engaged with each other in the state that strong force is always exerted between them, when a speed changing apparatus of bicycles is shifted from higher speed to lower speed.

In order to assist in understanding the present invention, firstly, structure and operation of the speed changing apparatus of bicycles, in which a forced speed changing apparatus 1 of the present invention can be applied, will be described.

As shown in FIGS. 2 to 6, the speed changing apparatus of bicycles includes a hub shaft 10 having an outer circumference on which first and second pawls 12 and 13 are mounted; a pawl controlling ring 15 which controls the pawls 12 and 13; a carrier 20 which is disposed at outside of the pawl controlling ring 15; a first and second sun gears 23 and 24 which are engaged with the hub shaft 10 by operation of the first and second pawls 12 and 13; a plurality of planetary gears 22 which are engaged with the first and second sun gears 23 and 24; a hub shell 30 in which the carrier 20 is received, and having a ring gear 31 engaged with the plurality of planetary gears 22; a cover 40 which seals the hub shell 30; a speed changing unit 50 which is located outside the hub shell so as to rotate the pawl controlling ring 15; and a supporting unit 60 which supports the hub shaft 10.

Figure 5:
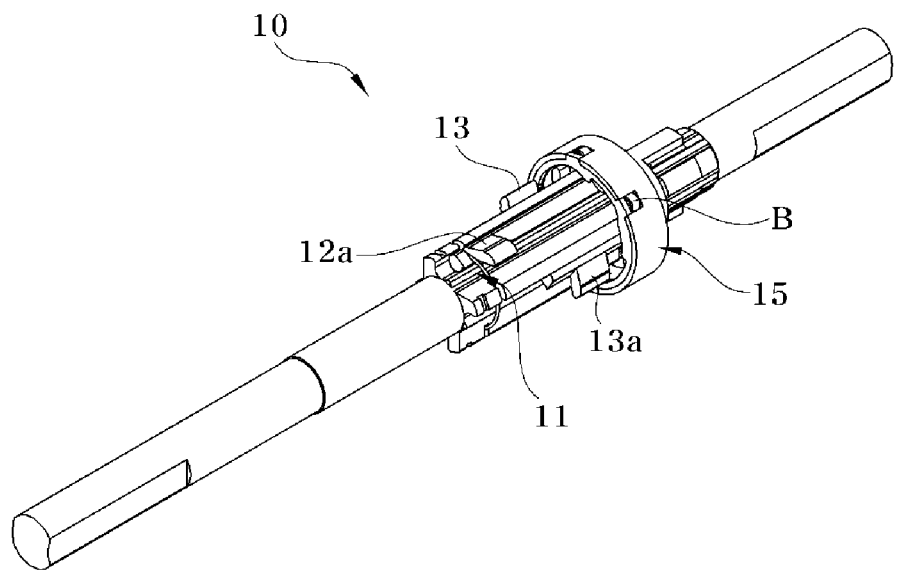
FIG. 5 is a perspective view of a hub shaft according to the present invention.

As shown in FIG. 5, both ends of the hub shaft 10 are respectively fixed to a frame (not shown). Pawl mounting portions 11 are longitudinally formed along the hub shaft 10, at which the first and second pawls 12 and 13 are installed.

Operation angles of the first and second pawls 12 and 13 are controlled by rotation of the pawl controlling ring 15, and thus the hub shaft 10 is engaged with an inner circumference of one or all of the first and second sun gears 23 and 24 which are disposed to be rotated while enclosing the outer surfaces of the first and second pawls 12 and 13, thereby achieving the speed change.

Figure 6A:
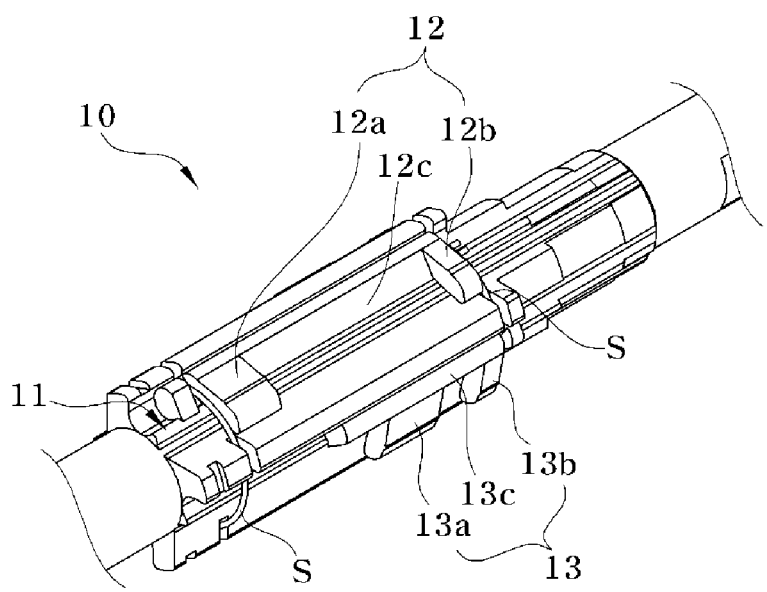
FIG. 6A is a perspective view of a pawl mounting portion and first and second pawls according to the present invention.

More detailedly, as shown in FIG. 6A (refer to FIGS. 10A and 10B), the first and second pawls 12 and 13 installed at the pawl mounting portion 11 includes a first and second fixing pawls 12a and 13a which are fixedly engaged with a first and second fixing protrusions 23b and 24b formed at the inner circumferences of the first and second sun gears 23 and 24, a first and second sagging pawls 12b and 13b which are col-linearly disposed with the first and second fixing pawls 12a and 13a so as to be extended to a side end of the pawl mounting portion 11, and a first and second connecting portions 12c and 13c which connect the first and second sagging pawls 12b and 13b and the first and second fixing pawls 12a and 13a.

Figure 6B:
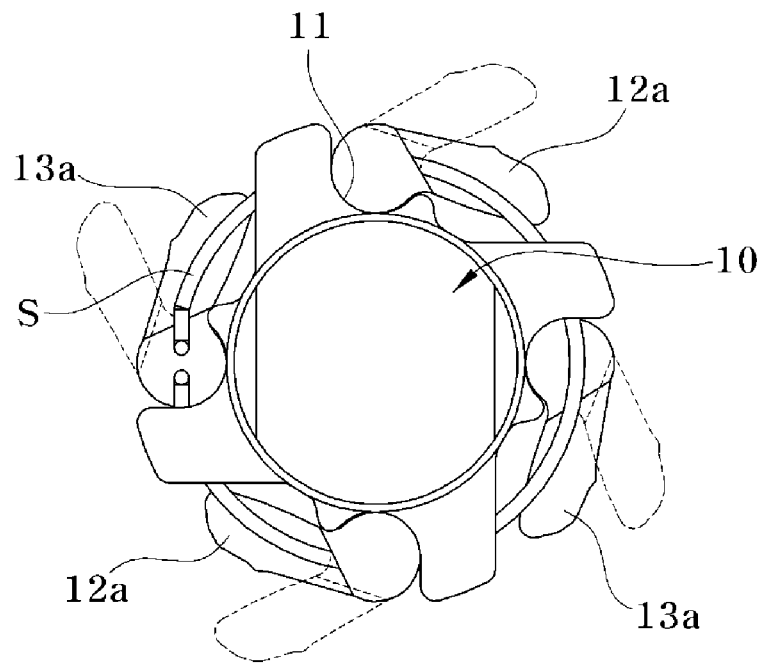
FIG. 6B is a view showing a status that first and second pawls are assembled on the pawl mounting portion according to the present invention.
Figure 7A:
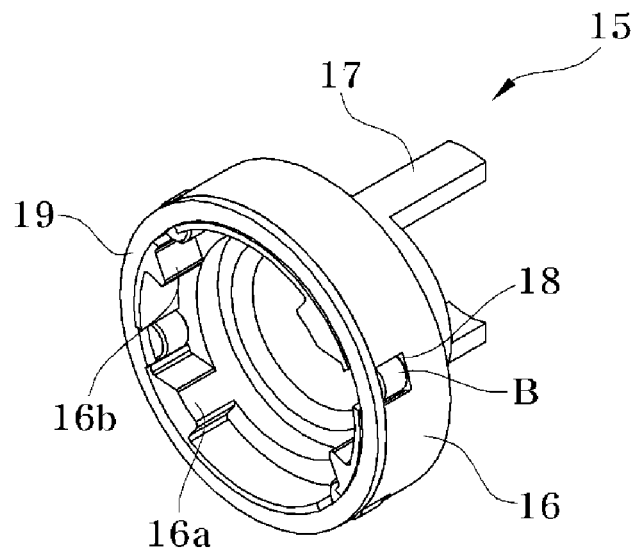
FIGS. 7A and 7B are perspective views of a pawl controlling ring according to a first embodiment of the present invention.
Figure 7B:
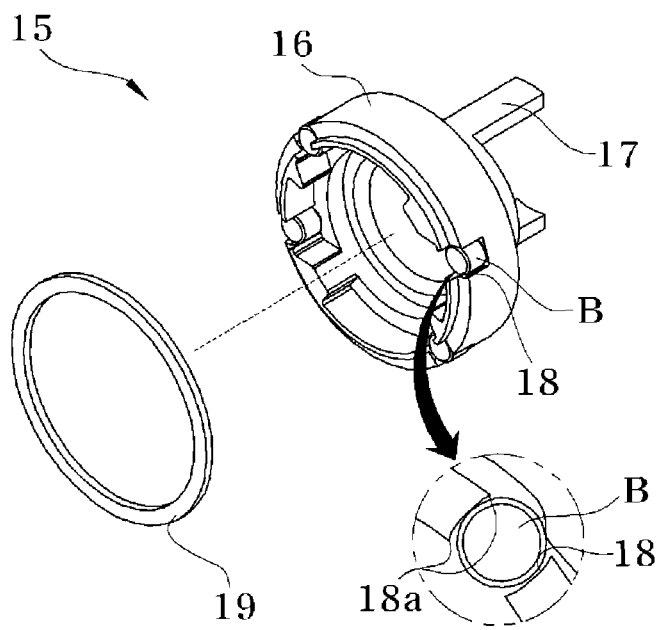
Figure 8A:
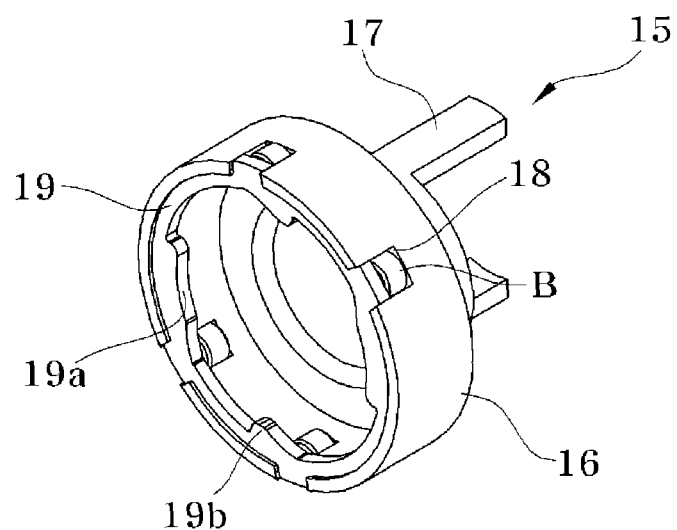
FIGS. 8A and 8B are perspective views of the pawl controlling ring according to a second embodiment of the present invention.
Figure 8B:
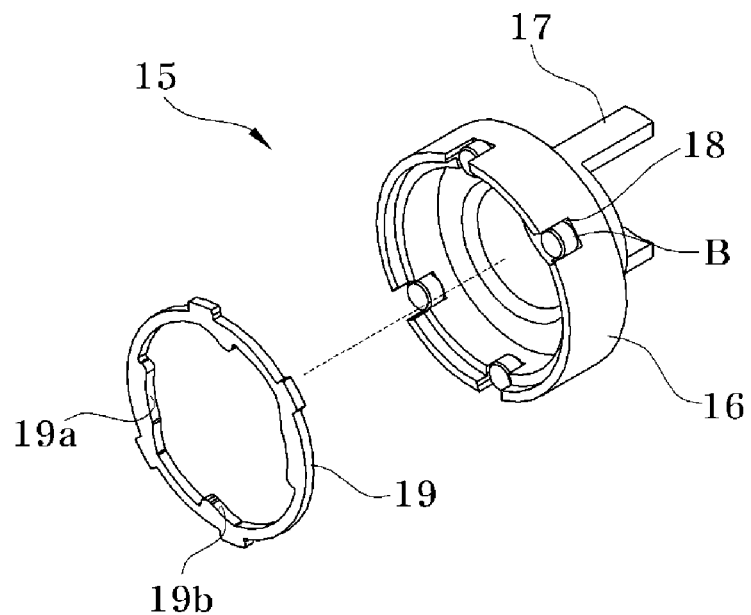

As shown in FIG. 6B, a ring-shaped spring S is disposed at the first and second pawls 12 and 13 so that desired force is always exerted between the first and second pawls 12 and 13 and ends of the first and second pawls 12 and 13 are raised up. As shown in FIGS. 7 and 8, the pawl controlling ring 15 is disposed at the outer surfaces of the first and second sagging pawls 12b and 13b, which are extended to the side end of the pawl mounting portion 11, so as to enclose the first and second sagging pawls 12b and 13b. Therefore, the ends of the first and second sagging pawls 12b and 13b are pushed down or released by the rotation of the pawl controlling ring 15, and the first and second fixing pawls 12a and 13a connected with the first and second sagging pawls 12b and 13b are also pushed down or released, and thus the first and second fixing protrusions 23b and 24b formed at the inner circumferences of the first and second sun gears 23 and 24 are engaged or disengaged with the first and second fixing pawls 12a and 13a. To this end, first and second push protrusions 16a, 16b, 19a and 19b are formed at the inner circumference of the pawl controlling ring 15 so as to control the first and second sagging pawls 12b and 13b.

As shown in FIGS. 4, 9A, 9B and 11, a plurality of planetary gears 22 are disposed at one side of the carrier 20 and a sprocket mounting portion 21a on which a sprocket 26 is installed is provided at the opposite side of the plurality of the planetary gears 22 of the carrier 20.

Figure 2:
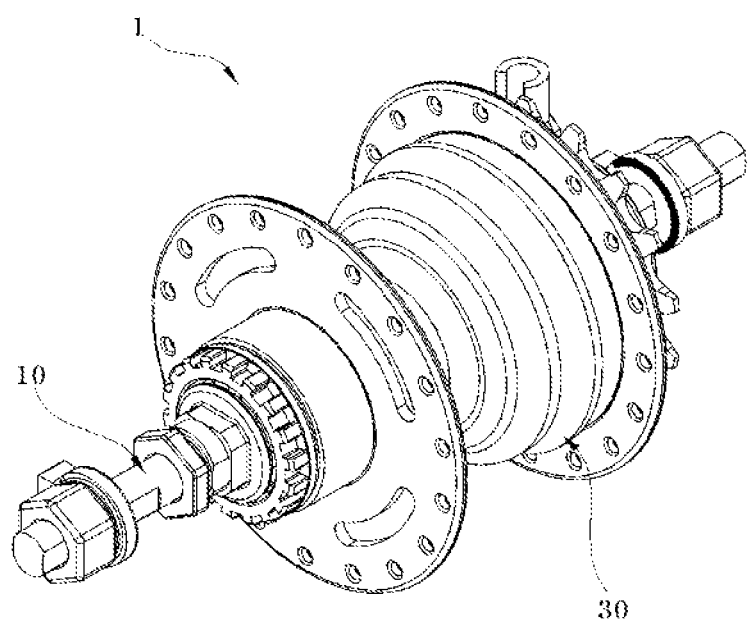
FIG. 2 is a perspective view of a forced speed changing apparatus of the bicycle according to the present invention.
Figure 3:
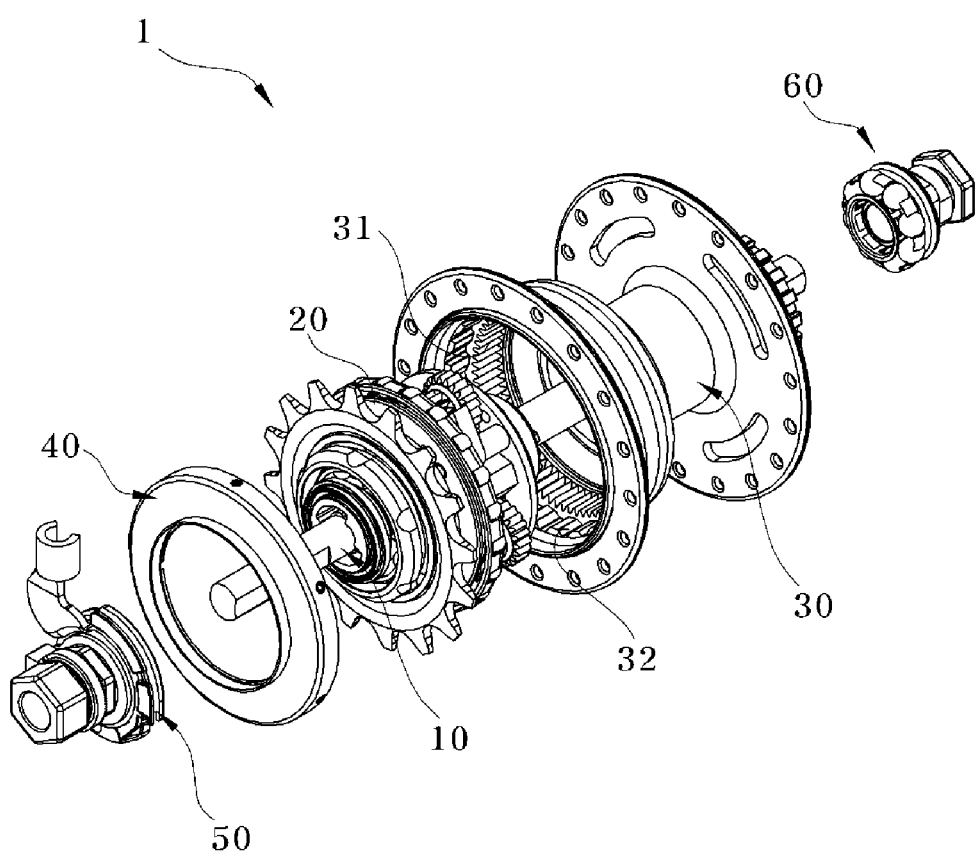
FIG. 3 is an exploded perspective view of FIG. 2.
Figure 9A:
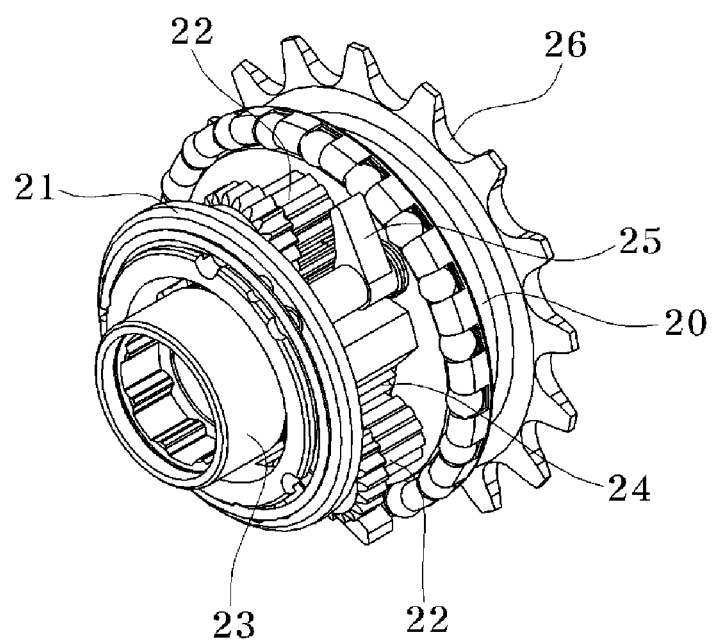
FIG. 9A is a perspective view of a carrier according to the present invention.
Figure 9B:
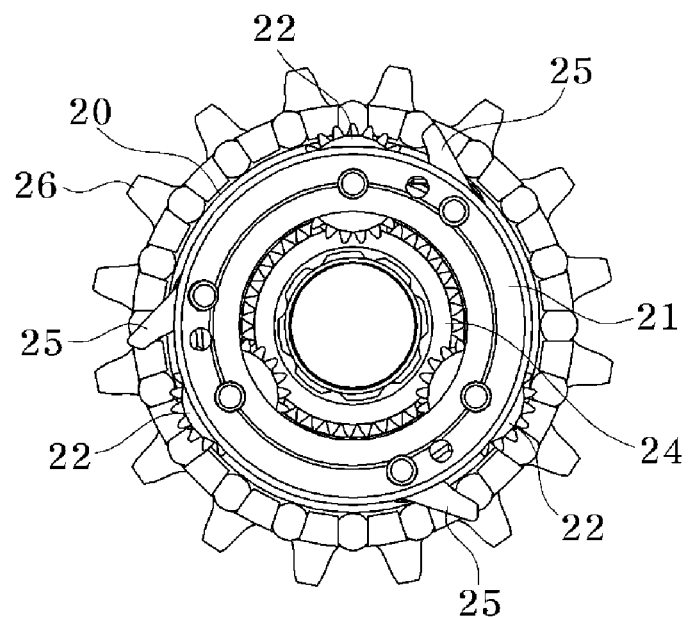
FIG. 9B is a front view of the carrier according to the present invention.
Figure 11:
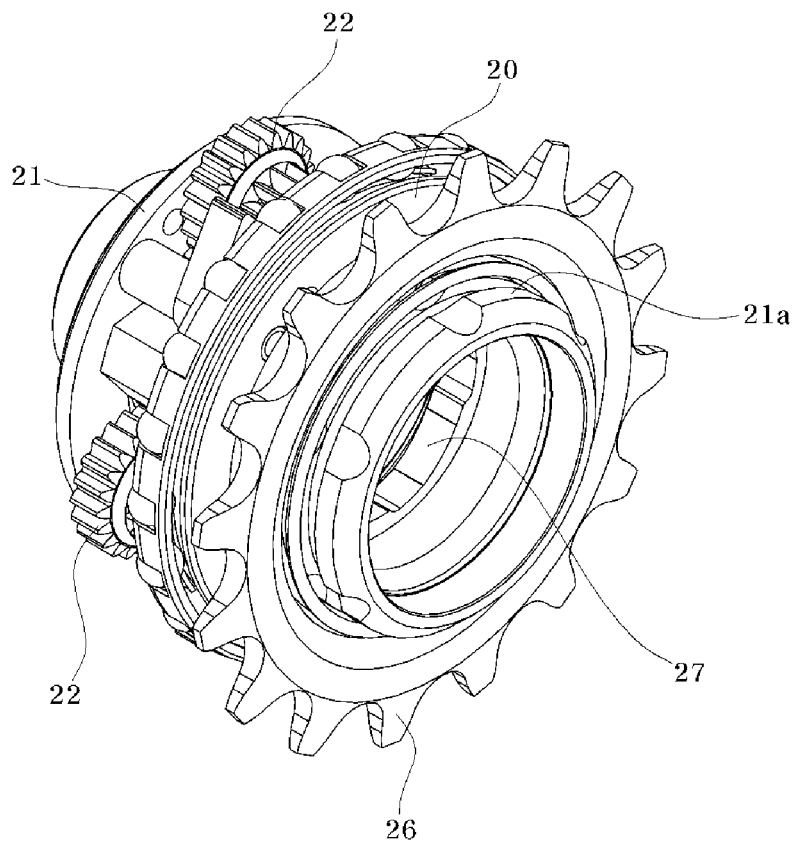
FIG. 11 is a perspective view of the carrier, when seeing from a back side thereof, according to the present invention.

As shown in FIGS. 2, 9A and 11, a ratchet member 25 is further provided at the carrier 20, such that the hub shell 30 is engaged with the carrier 20 when the hub shell 30 is forwardly rotated, and the hub shell 30 is disengaged from the carrier 20 and only the hub shell 30 is rotated when the hub shell 30 is reversely rotated. The ratchet member 25 is always protruded to an outside by elastic force of a coil spring (not shown).

Figure 10A:
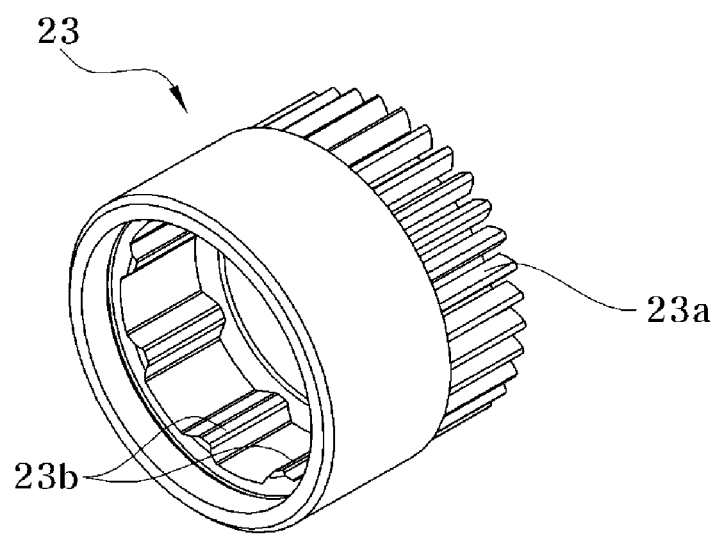
FIG. 10A is a perspective view of a first sun gear according to the present invention.
Figure 10B:
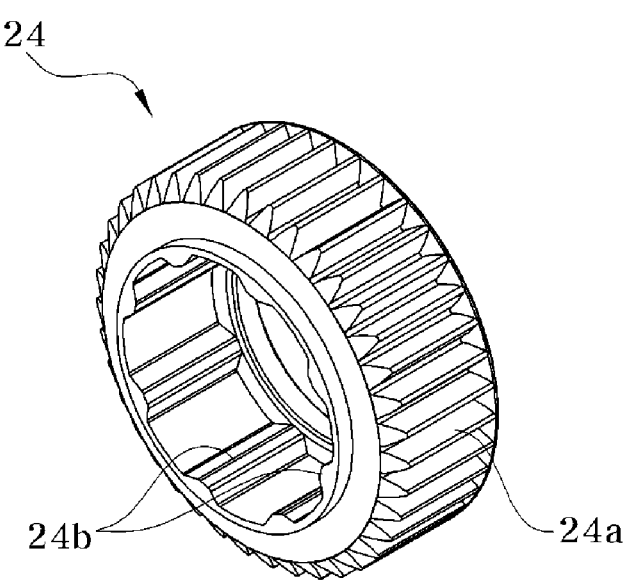
FIG. 10B is a perspective view of a second sun gear according to the present invention.

Meanwhile, as shown in FIGS. 10A and 10B respectively, the first and second sun gears 23 and 24 have a first and second gear part 23a and 24a formed at the outer circumference thereof. The gear parts 23a and 24a are respectively engaged with the large gear part and the small gear part of the planetary gears 22. And a first and second fixing protrusion 23b and 24b are formed at the inner circumferences of the first and second sun gears 23 and 24 so as to be respectively engaged with the first and second fixing pawls 12a and 13a which are raised up.

Figure 13:
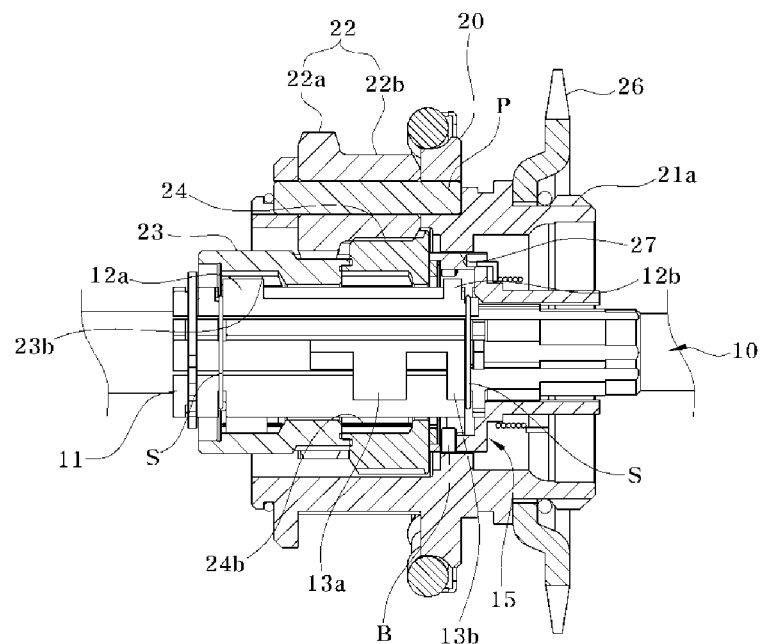
FIG. 13 is a cross-sectional view showing a coupled state of the hub shaft and the carrier according to the present invention.

As shown in FIG. 13, the carrier 20 is disposed to receive the pawl controlling ring 15 provided at the hub shaft 10. And the first and second sun gears 23 and 24 are horizontally disposed between the plurality of the planetary gears 22 installed at the carrier 20 and the hub shaft 10. In a state that the first and second sun gears 23 and 24 are respectively engaged with the large and small gear part, if the first and second fixing protrusions 23b and 24b formed at the inner circumferences of the first and second sun gears 23 and 24 are engaged with the first and second pawls 12 and 13 by rotation controlling of the pawl controlling ring 15, the first and second sun gears 23 and 24 engaged with the first and second pawls 12 and 13 are fixed together with the hub shaft 10, and thus rotational driving force of the sprocket 26 is transmitted with a gear ratio of one of the large and small gear parts of the planetary gears 22, thereby achieving the speed changing.

Herein, as shown in FIG. 13, the planetary gears 22 are fixed to the carrier 20 by a plurality of pins P so as to be engaged with gears formed at the outer circumferences of the first and second sun gears 23 and 24, and each of the planetary gears 22 is revolved about each rotating shaft of the sun gears 23 and 24 and is rotated about each rotating shaft of the pins P by the rotation of the carrier 20.

The rotational force of the planetary gears 22 are transferred to a ring gear 31 formed at an inner circumference of the hub shell 30, and thus the hub shell 30 is rotated, thereby achieving the speed changing from higher speed and to lower speed through a gear ratio of the planetary gears 22 engaged with the first sun gear 23 or the second sun gear 24 and a gear ratio of the rotated planetary gears 22 and the ring gear 31.

Figure 14:
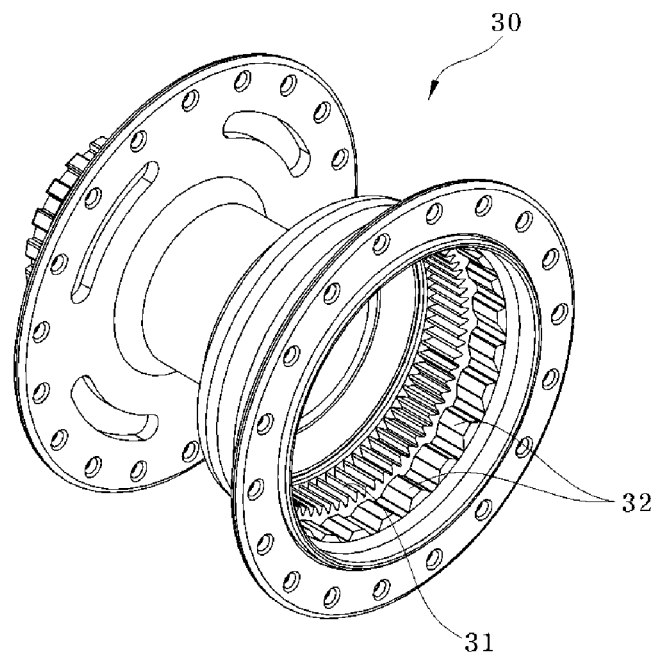
FIG. 14 is a perspective view of a hub shell according to the present invention.
Figure 15:
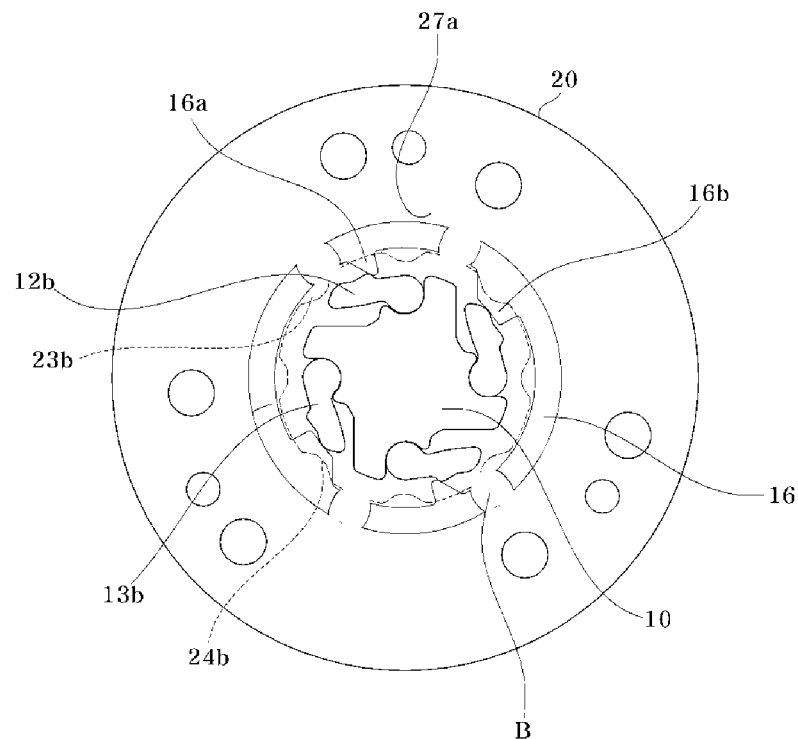
FIG. 15 is a cross-sectional view showing a coupled structure of the pawl, the pawl controlling ring and the spline groove according to the present invention.

As shown in FIG. 14, the hub shell 30 received the hub shaft 10 and the carrier 20 therein is formed into a cylindrical housing of which the inner circumference is formed with the ring gear 31 engaged with the planetary gears 22 and ratchet-teeth 32 engaged with the ratchet member 25 so as to transmit the rotational force in only one direction. A driving wheel of a bicycle is provided at an outer circumference of the hub shell 30.

Figure 4:
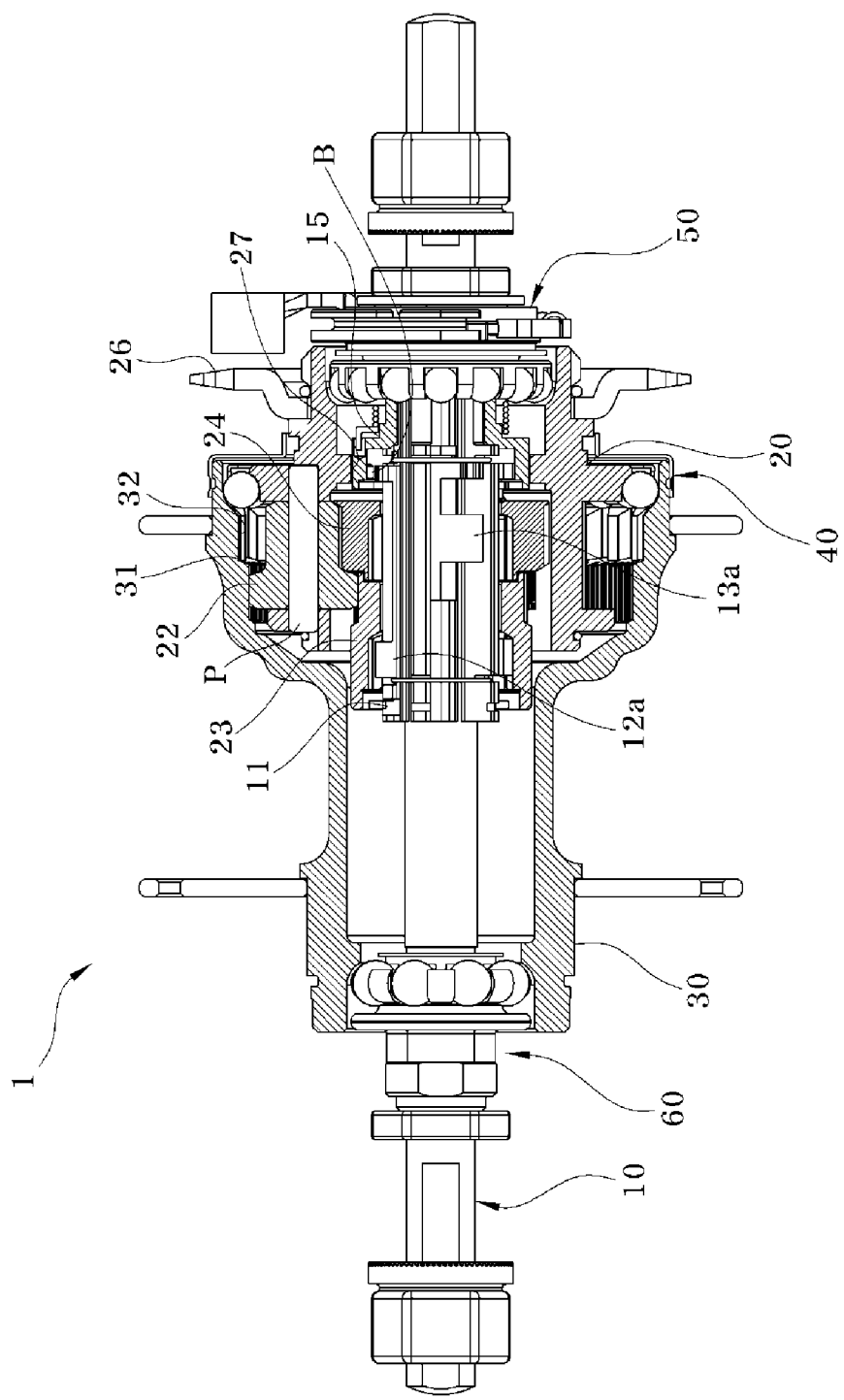
FIG. 4 is a cross-sectional view of FIG. 2.

As shown in FIG. 4, the cover 40 sealing an opened side surface of the hub shell 30 is provided at the side surface of the hub shell 30, and then integrally fixed to the hub shell 30 by force or by a separate coupling member.

The speed changing apparatus of bicycles, as described above, is operated by controlling of the speed changing unit 50. To this end, the speed changing unit 50 is provided with a transforming disk (not shown). The transforming disk is generally connected with a lever provided at a handle of the bicycle through a wire (not shown). Therefore, if a user operates the lever, the wire connected with the transforming disk is pulled or loosed. When the wire is pulled, the transforming disk is rotated by the wire, and a controlling bar 17 provided at a rear side of the pawl controlling portion 15 is also rotated, and thus the pawl controlling portion 15 is rotated. And when the wire is loosed, the transforming disk and the pawl controlling ring 15 are integrally returned by elastic force of a return spring (not shown) provided at one side of the pawl controlling ring 15, and thus the pawl controlling ring 15 selects the first and second pawls 12 and 13 engaged with or disengaged with the first and second sun gears 23 and 24.

The supporting unit 60 disposed at a space between the hub shaft 10 and the hub shell 30 smoothly rotates the hub shell 30 by using a component such as a ball bearing installed between the hub shell 30 and the hub shaft 10.

In the speed changing apparatus of bicycles of the present invention, as described above, the first and second pawls 12 and 13 and the first and second fixing protrusions 23b and 24b of the first and second sun gears 23 and 24 are fixedly engaged with each other so as to transmit the driving force of the sprocket 26 to the wheel. Herein, if the lever provided at the handle is operated by the user so as to decelerate the speed of the bicycle, the wire connected to the lever rotates the transforming disk of the speed changing unit 50, and the pawl controlling ring 15 is rotated at a desired angle, and the engagement between the first and second fixing pawls 12a and 13a and the first and second fixing protrusions 23b and 24b of the first and second sun gears 23 and 24 has to be released. However, as described above, since the first and second fixing pawls 12a and 13a and the first and second fixing protrusions 23b and 24b are strongly engaged with each other, it is not facile to release the engagement therebetween.

Therefore, the present invention provides a forced speed changing apparatus of bicycle, by which the engagement between the first and second fixing pawls 12a and 13a and the fixing protrusions 23b and 24b of the first and second sun gears 23 and 24 is physically released by a pressure member installed at the pawl controlling ring 15 to be described later, when the transforming disk is rotated by the lever, and thus it is possible to certainly and easily shift the gears with small force. The pressure member may be a pressure roller B or a pressure ball B'. Hereinafter, the forced speed changing apparatus of bicycle will be further described in detail.

It has been described above that the first and second push protrusions 16a and 16b of the pawl controlling ring 15 for controlling the first and second sagging pawls 12b and 13b are formed at the inner circumference of the ring housing 16 of the pawl controlling ring 15. However, since operation and structure thereof is changed according to a place that the first and second push protrusions 16a and 16b of the pawl controlling ring 15 are formed, it will be described in each embodiment.

First Embodiment

As described above, the first embodiment is to form the first and second push protrusions 16a and 16b at the inner circumference of the ring housing 16 of the pawl controlling ring 15. Herein, as shown in FIGS. 7A and 7B, the forced speed changing apparatus of the bicycle includes the cylindrical ring housing 16, the pressure member which is disposed at a plurality of mounting holes 18 formed at the outer circumference of the ring housing 16, the controlling bar 17 which is disposed at the rear side of the ring housing 16 so as to rotate the ring housing 16 along with rotation of the speed changing unit 50, the first and second push protrusions 16a and 16b which are formed at the inner circumference of the ring housing 16 so as to push or release the first and second sagging pawls 12b and 13b, and a cylindrical fixing ring 19 which is disposed at a front side of the ring housing 16.

The fixing ring 19 disposed at the front side of the ring housing 16 functions to prevent the pressure member installed in the mounting hole 18 from being separated.

Preferably, the pressure member is not a spherical ball, but a pressure roller which is rotated about a rotational shaft.

The mounting hole 18 is formed to have a desired clearance in which the pressure member can be moved up and down within a proper extent, and a protruded portion 18a is formed at inner and outer sides of the mounting hole 18 so as to prevent the pressure member from being separated.

Figure 12A:
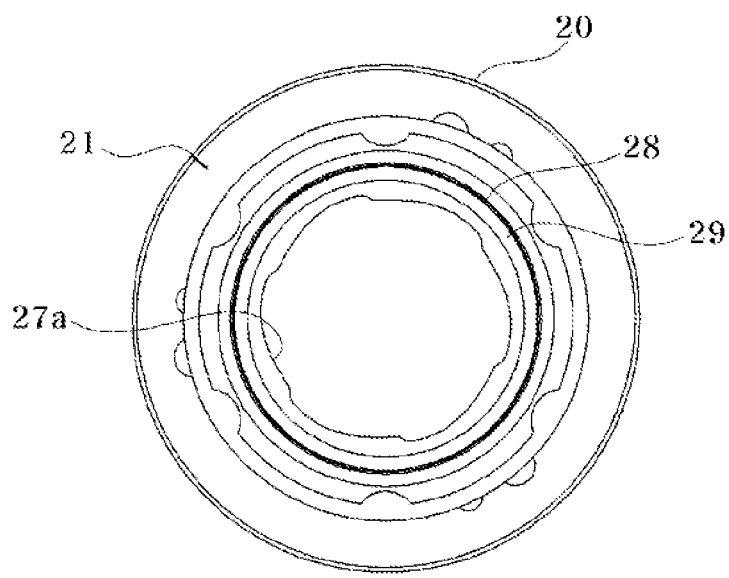
FIGS. 12A and 12B are front views of spline grooves according to present invention.
Figure 12B:
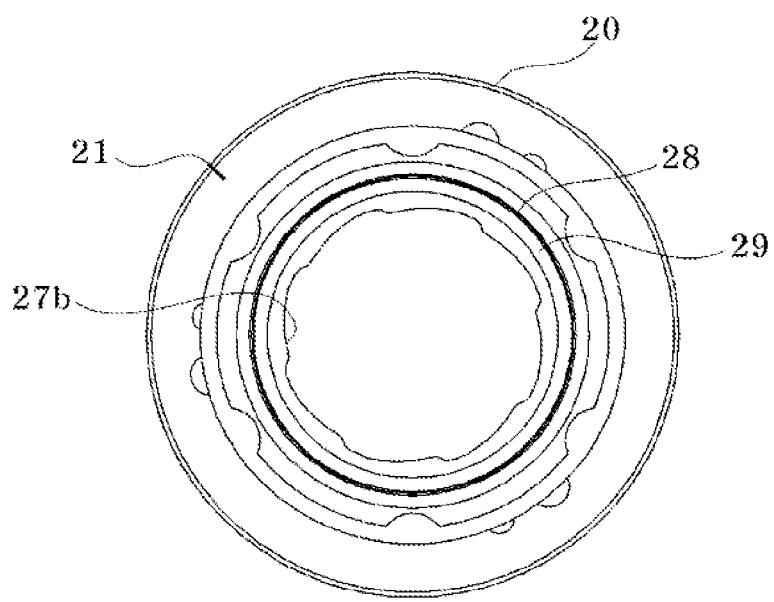

As shown in FIGS. 11, 12A and 12B, spline grooves 27, 27a and 27b are formed at the inner circumference of the carrier 20 so that the pressure member of the pawl controlling ring 15 can be rolled along the spline grooves 27, 27a and 27b, and thus moved up and down in the pawl controlling ring 15.

Hereinafter, the operation of the forced speed changing apparatus of bicycle will be described according to each case of gear shifting.

(1) Gear Shifting from a Low Stage to a High Stage

In this case, the pawl controlling 15 and the carrier 20 are rotated in the same direction as a driving direction of the bicycle (hereinafter, called "forward rotation").

Figure 16A:
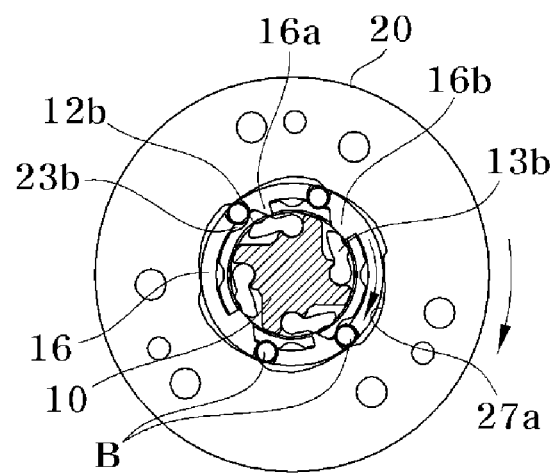
FIGS. 16A, 16B, 16C, 16D, 16E and 16F are views showing operation states of FIG. 15.

At the early stage, as shown in FIG. 16A, the pawl controlling ring 15 is maintained in a state that the first and second sagging pawls 12b and 13b installed on the hub shaft 10 is pressed by the first and second push protrusions 16a and 16b. Therefore, since the first and second sun gears 23 and 24 are not fixed to the hub shaft 10, the speed changing is not occurred according to the gear ratio of the planetary gears 22 and the first and second sun gears 23 and 24, and the driving force generated by the sprocket 26 is directly transferred to the ratchet teeth 32 through the ratchet member 25 so as to rotate the hub shell 30. In this stage, the forced speed changing apparatus is in a state of a first gear stage, i.e., a gear ratio of 1:1 in which the speed is not increased.

Then, if the lever is operated into a second gear stage by a user, the transforming disk of the speed changing unit 50 is rotated, and the pawl controlling ring 15 is rotated at a desired angle.

Figure 16B:
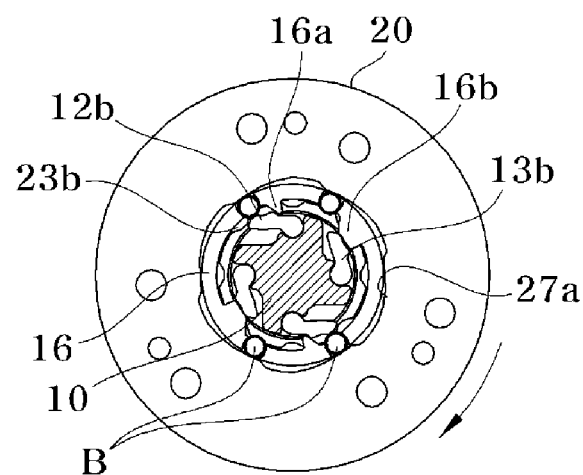
Figure 16C:
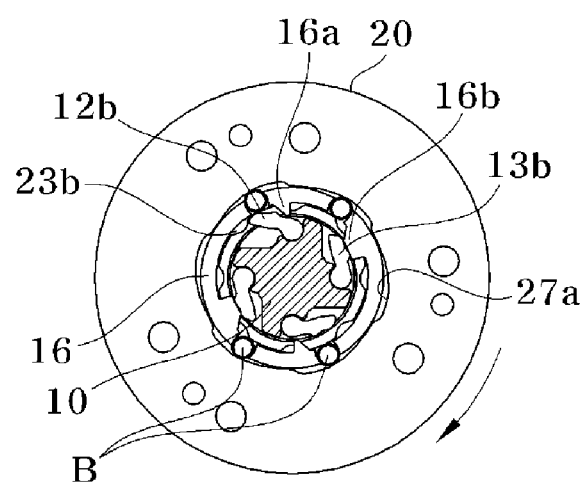
Figure 16D:
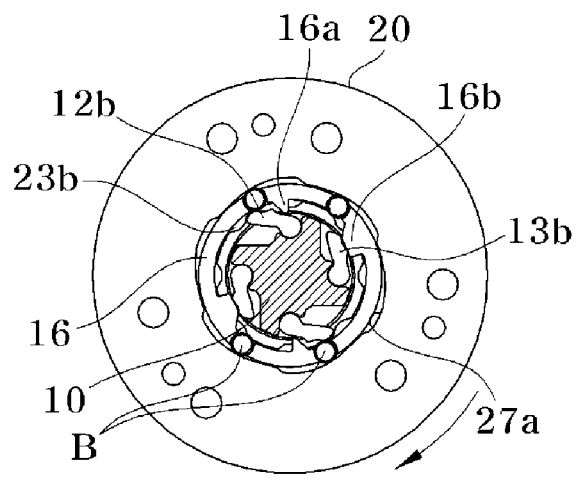

Herein, as shown in FIGS. 16B, 16C and 16D, a position of the first and second push protrusions 16a, 16b formed at the inner circumference of the ring housing 16 is changed by the rotation of the pawl controlling ring 15, and thus the first pawl 12 pressed by the first push protrusion 16a is released and then automatically raised up by the elastic force of the spring S, but the second pawl 13 is still pressed.

The first pawl 12 released from restriction of the pawl controlling ring 15 is engaged with the first fixing protrusion 23b formed at the inner circumference of the first sun gear 23, and thus the first sun gear 23 is fixed to the hub shaft 10 and the planetary gears 22 engaged with the first sun gear 23 are rotated, thereby performing the speed change.

The above description is an example of the case that the first sun gear 23 is set to a relatively lower gear ratio than the second sun gear 24. In case that the first sun gear 23 is set to a higher gear ratio than the second sun gear 24, the second sun gear 24 is fixed.

Figure 16E:
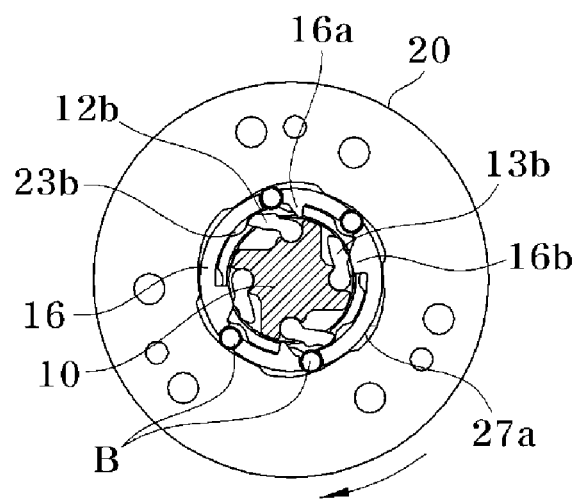
Figure 16F:
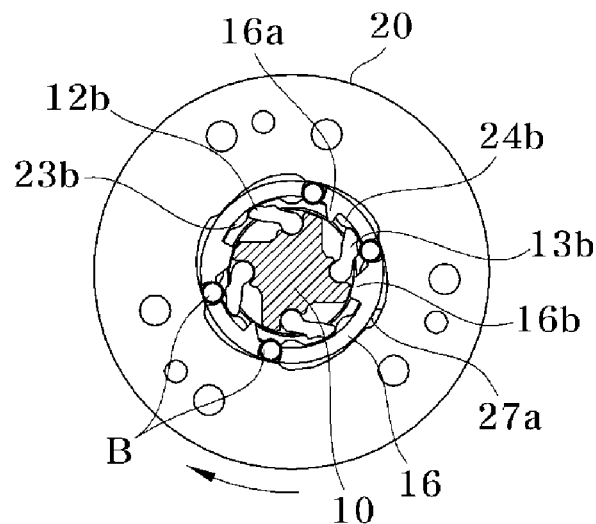

If the bicycle is driven in the second gear stage through the above-mentioned process and then shifted again into a high gear stage, the pawl controlling ring 15 is further rotated at a proper angle by the speed changing unit 50, as shown in FIGS. 16E and 16F. Therefore, the pressure of the second push protrusion 16b is released, and the second pawl 13 is automatically raised up by the spring S and fixed to the second fixing protrusion 24b of the second sun gear 24, and thus all of the first and second sun gears 23 and 24 are fixed to the hub shaft 10.

Herein, since all of the first and second sun gears 23 and 24 are fixed to the hub shaft 10, even though two sets of planetary gears 22 engaged with the first and second sun gears 23 and 24 are rotated, the hub shell 30 is shifted into the higher gear stage according to a rotational speed of the planetary gear 22 engaged with the second sun gear 24 having a higher gear ratio that has the relatively large number of rotation.

(2) Shifting from a Higher Gear Stage to a Low Gear Stage

In this case, the pawl controlling 15 is rotated in an opposite direction to the driving direction of the bicycle ("hereinafter, called "reverse rotation"), and the carrier 20 is rotated forwardly.

The shifting from a higher gear stage to a lower gear stage is performed in order of FIGS. 16F-16E. Since the shifting process from a third gear stage (FIG. 16F) to a second gear stage (FIG. 16E) is substantially the same as that from the second gear stage (FIG. 16E) to the first gear stage (FIG. 16A), the shifting process from the second gear stage (FIG. 16E) to the first gear stage (FIG. 16A) will be described representatively.

If a pedal is continuously operated during the shifting process from the second gear stage (FIG. 16E) to the first gear stage (FIG. 16A), since strong force is applied between the first and second fixing pawls 12a and 13a and the first and second fixing protrusions 23b and 24b engaged with each other, it is difficult to perform the gear shifting. A process for solving this problem is as follows.

Before the first push protrusion 16a presses the first sagging pawl 12b, the pressure member is firstly contacted with the first sagging pawl 12b (FIG. 16D). Herein, if the strong force is applied between the first fixing pawl 12a and the first fixing protrusion 23b, the pressure member is intended to be protruded outside the ring housing 16 by an inclination of the first sagging pawl 12b. The carrier 20 is continuously rotated while the pedal is driven, and thus the pressure member is located at a deep portion (valley) of the spline groove 27a (FIG. 16C).

The carrier 20 is further rotated in the driving direction by the driving force of the pedal, and thus the pressure member located at the deep portion of the spline groove 27a is gradually protruded into the ring housing 16. At a shallow portion (mountain) of the spline groove 27a, the pressure member is maximally protruded into the ring housing 16. Therefore, the first sagging pawl 12b contacted with the pressure member is pressed strongly, and the engagement between the first fixing pawl 12a and the first fixing protrusion 23b is released (FIG. 16B). Then, the released first sagging pawl 12b is easily controlled by the first push protrusion 16a by pulling force of the return spring or wire, thereby shifting to the first gear stage.

Therefore, even though very small force is exerted to the pawl 15, the pressure member which is protruded into the ring housing 16 along the spline groove 27a rotated by the driving force of the pedal and an inclined surface of the spline groove 27a can smoothly restrict the first and second pawls 12 and 13 engaged with the fixing protrusions 23b and 24b. Therefore, it is possible to easily and facilely perform the shifting process.

According to the present invention, since it is possible to perform the shifting process even in the state that the pawl is strongly engaged with the fixing means, it is not necessary to temporarily release the driving force in order to perform the speed changing.

Second Embodiment

Figure 17:
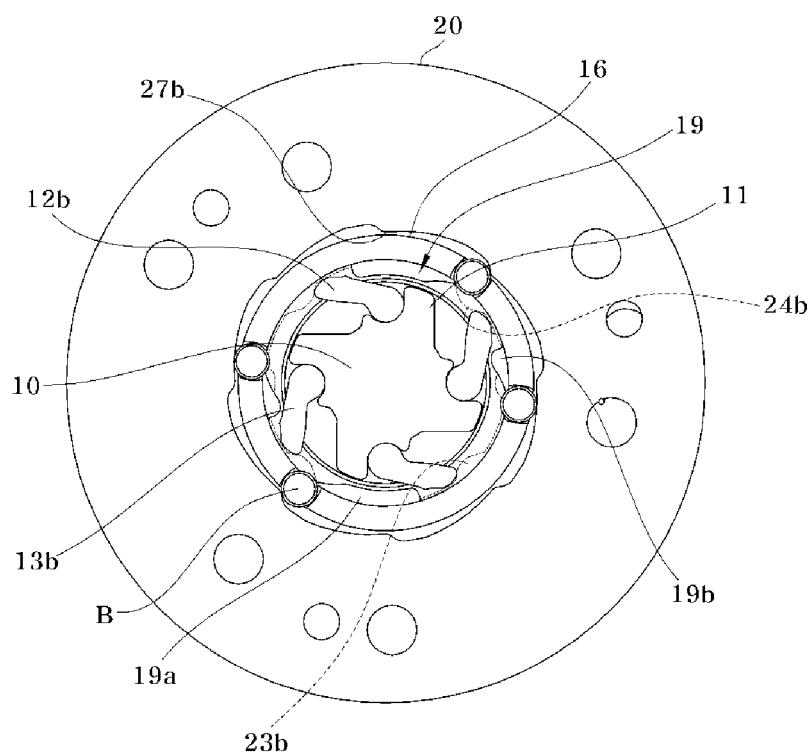
FIG. 17 is a cross-sectional view showing another coupled structure of the pawl, the pawl controlling ring and the spline groove according to the present invention.

In the second embodiment, unlike the first embodiment, all of the pressure member and the first and second push protrusions 19a and 19b of the pawl controlling ring 15 are not disposed at the ring housing 16. Instead, the first and second push protrusions 19a and 19b of the pawl controlling ring 15 is provided at the fixing ring 19 disposed at the front side of the ring housing 16, and the pressure member is provided at the ring housing 16, as shown in FIG. 17, and the rest constructions thereof are the same as in the first embodiment.

Further, in the second embodiment, the operation of the pawl controlling ring 15 and the carrier 20 is performed in reverse of the first embodiment.

Hereinafter, the operation of the forced speed changing apparatus of bicycle will be described according to a shifting state.

(1) Shifting from a Higher Gear Stage to a Lower Gear Stage (the Pawl Controlling Ring 15, the Carrier 20=Forward Rotation)

In this case, all of the pawl controlling ring 15 and the carrier 20 are rotated forwardly.

Figure 18A:
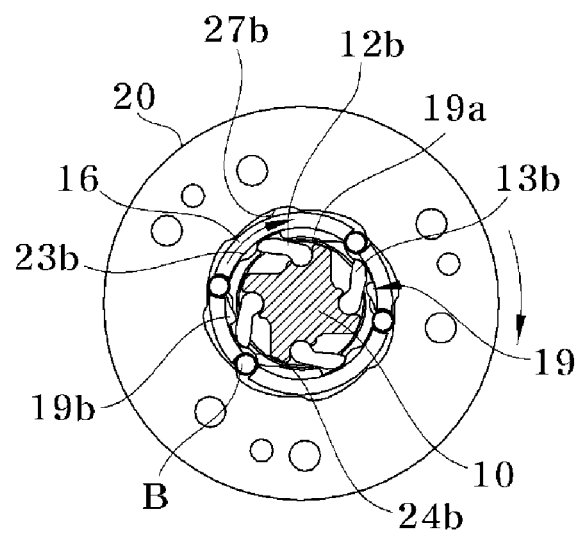
FIGS. 18A, 18B, 18C, 18D, 18E and 18F are views showing operation states of FIG. 17.
Figure 18B:
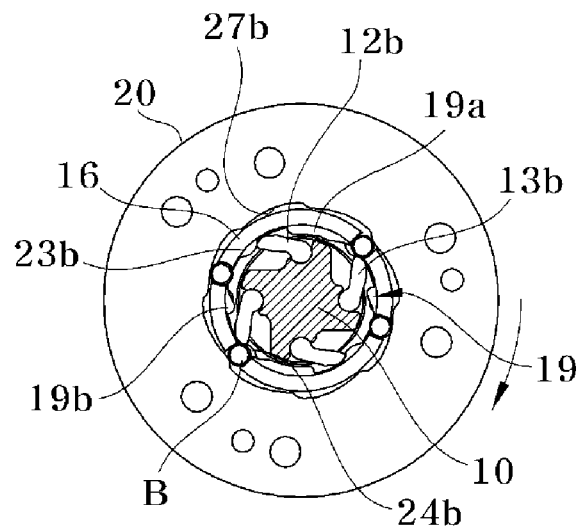
Figure 18C:
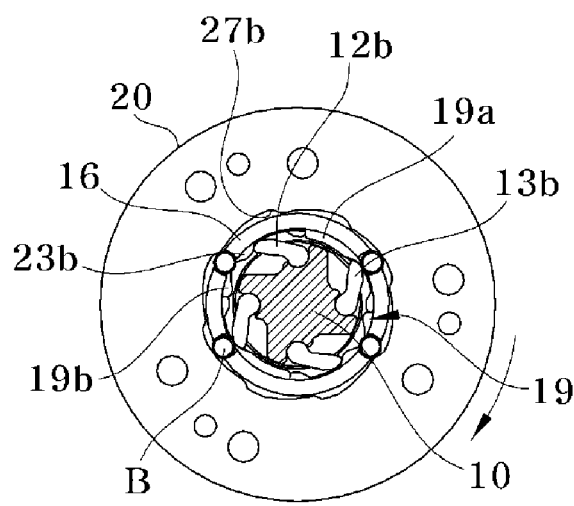
Figure 18D:
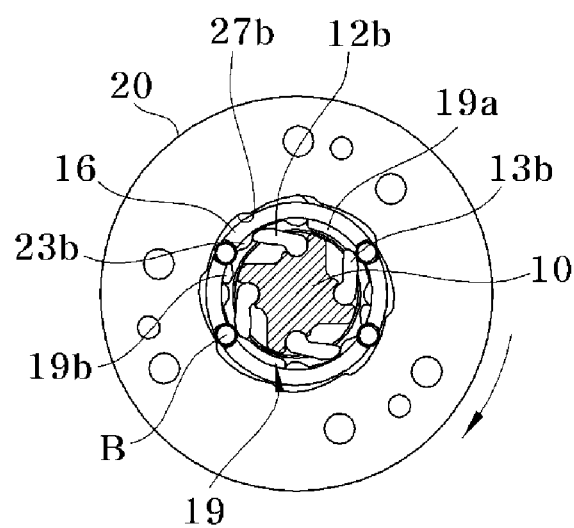
Figure 18E:
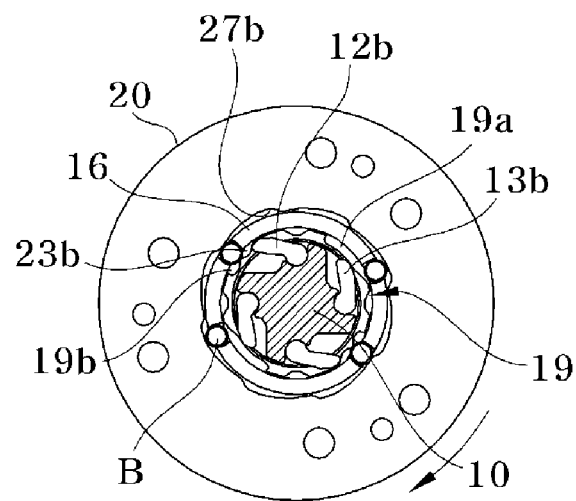
Figure 18F:
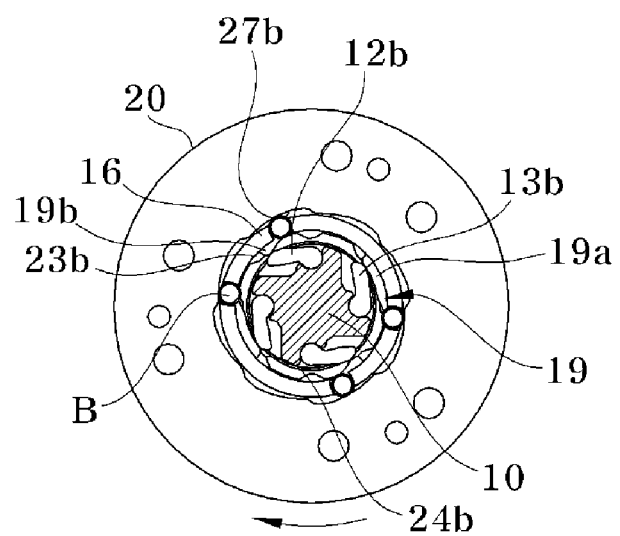

The shifting from a higher gear stage to a lower gear stage means a shifting process from a third gear stage (FIG. 18A) to a second gear stage (FIG. 18E) or from a second gear stage (FIG. 18E) to a first gear stage (FIG. 18F). Since the shifting process from the third gear stage (FIG. 18A) to the second gear stage (FIG. 18E) is substantially the same as that from the second gear stage (FIG. 18E) to the first gear stage (FIG. 18F), the shifting process from the third gear stage (FIG. 18A) to the second gear stage (FIG. 18E) will be described representatively.

If a pedal is continuously operated during the shifting process from the third gear stage (FIG. 18A) to the second gear stage (FIG. 18E), since the strong force is applied between the second fixing pawl 13a and the second fixing protrusion 24b, it is difficult to perform the shifting. A process for solving the problem is as follows.

The carrier 20 having the spline groove 27b including a pocket space and an inclined surface formed at the inner circumference of the carrier 20 is located outside the ring housing 16 of the pawl controlling ring 15. The carrier 20 is rotated by the driving force of the pedal, and the inclined surface of the spline groove 27b formed at the inner circumference of the carrier 20 presses the pressure member so that the pressure member is protruded into the ring housing 16, or a space in which the pressure member can be moved is formed so that the pressure member is protruded outside the ring housing 16.

In FIG. 18A, the second fixing pawl 13a and the second fixing protrusion 24b are engaged with each other in the third gear stage. Herein, if the wire is operated while the pedal is continuously driven, the transforming disk is rotated by the pulling force of the wire or the returning force of the return spring. Before the second push protrusion 19b of the pawl controlling ring 15 which is assembled with the transforming disk so as to be rotated along with the rotation of the transforming disk is engaged with the second sagging pawl 13b, the pressure member is firstly contacted with the second sagging pawl 13b (FIG. 18B). In this situation, if the carrier 20 is continuously rotated by the driving force of the pedal, and the pocket space of the spline groove 27b of the carrier 20 is coincided with a position of the pressure member, the pressure member is protruded outside the ring housing 16 (FIG. 18C). If the carrier 20 is continuously rotated by the driving force of the pedal, the pressure member in the pocket space of the spline groove 27b of the carrier 20 is forcibly protruded into the ring housing 16 by the inclined surface of the spline groove 27b so as to push the second sagging pawl 13b. Therefore, the engagement between the second fixing pawl 13a and the second fixing protrusion 24b is released (FIG. 18D). Since the second fixing pawl 13a and the second fixing protrusion 24b are no longer engaged with each other, the second sagging pawl 13b can be easily controlled by the second push protrusion 19b, and thus it is possible to facilely shifted to the next gear stage (second gear stage), thereby performing the shifting process.

(2) Shifting from a Lower Gear Stage to a Higher Gear Stage

In case of shifting from a lower gear stage to a higher gear stage, the first gear stage state in which all of the first and second pawls 12 and 13 are disengaged, as shown in FIG. 18F, is converted into a state of FIG. 18E so that the first pawl 12 is raised up. Herein, the carrier 20 is rotated forwardly, and the pawl controlling ring 15 is rotated reversely.

If the first push protrusion 19a is rotated by the rotation of the pawl controlling ring 15, and the pressure member pressing the first sagging pawl 12b is removed, the end of the first sagging pawl 12b is automatically raised up at a desired angle by the elastic force of the spring S and then hooked with the fixing protrusion 23b of the first sun gear 23, and thus it is shifted to the second gear stage.

If it is shifted from the second gear stage to the third gear stage, the ring housing 16 and the fixing ring 19 are rotated in an opposite direction to the carrier 20 in order of FIGS. 18E, 18D, 18C, 18B and 18A. Therefore, the second sagging pawl 13b is released from the second push protrusion 19b of the fixing ring 19, the end of the second sagging pawl 13b is automatically raised up by the elastic force of the spring S and fixed to the second fixing protrusion 24b formed at the inner circumference of the second sun gear 24. Therefore, it is shifted into the third gear stage in which the first and second sun gears 23 and 24 are fixed to the hub shaft 10.

In the second embodiment, it has been described that the first and second push protrusions 19a and 19b are formed at the fixing ring 19, and the pressure member is provided at the ring housing 16. However, the positions of the pressure member and the first and second push protrusions 19a and 19b may be exchanged to each other. In this case, since it is possible to select whether it is shifted from the higher gear stage to the lower gear stage or from the lower gear stage to the higher gear stage according to the rotational direction of the pawl controlling ring 15, the degree of design freedom is increased.

In the previous description, the shape of the pawl controlling ring 15 is not explicitly described. The pawl controlling ring 15 may be formed into various shapes instead of the closed ring shape. For example, the controlling ring 15 may be formed into a semicircular shape, or an arc shape.

In the above-mentioned embodiment, it is described that the shifting operation is performed in the state that the driving force is exerted by the pedal, that is, the first and second fixing pawls 12a and 13a are strongly engaged with the first and second fixing protrusions 23b and 24b. However, the shifting operation may be performed in the state that the pedal is not driven, that is, the first and second fixing pawls 12a and 13a are loosely engaged with the first and second fixing protrusions 23b and 24b.

Further, in the above embodiment, the three-staged gear is described as an example, but the present invention may be also applied to a six or nine-staged gear. Further, in order to enhance the degree of design freedom, the structure and arrangement of the pawl controlling ring 15 may be changed variously.

Figure 19:
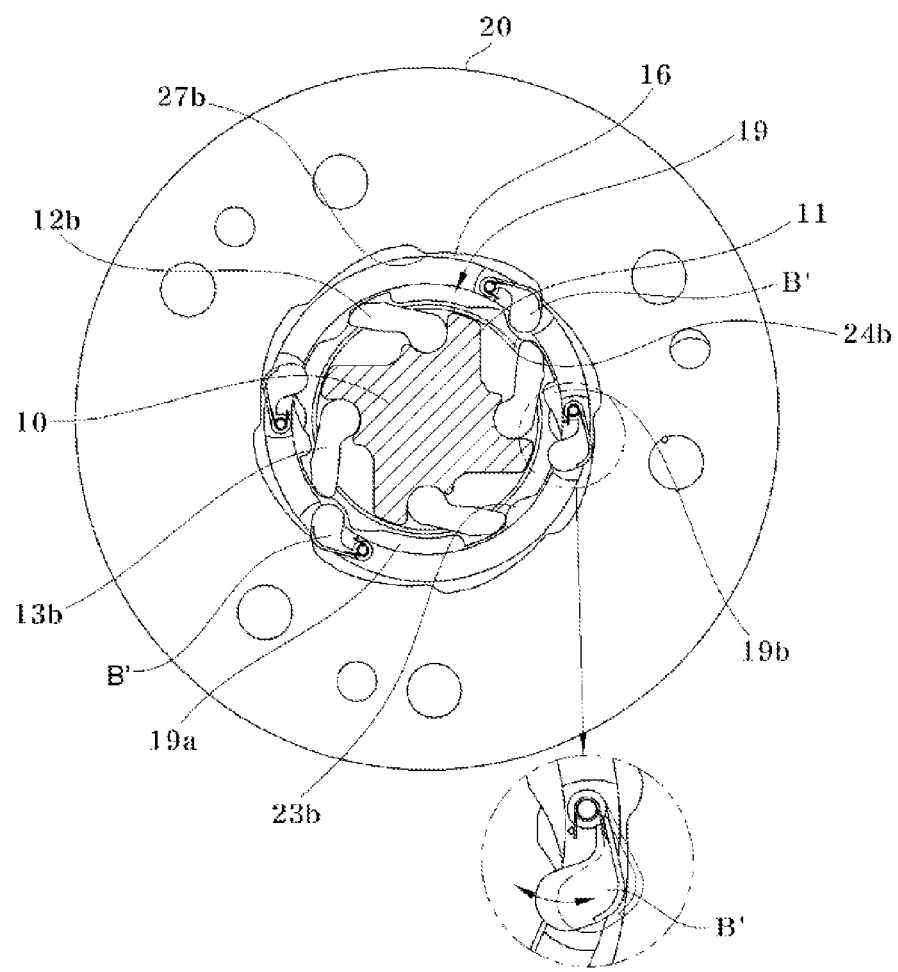
FIG. 19 is a cross-sectional view of a pressure member according to the present invention.

Meanwhile, in the first and second embodiments, the cylindrical pressure roller B is used as the pressure member for pressing the first and second pawls 12 and 13. However, as shown in FIG. 19, a pressure part B', of which one end is elastically supported by a coil spring so as to be rotated inside or outside the ring housing 16 of the pawl controlling ring 15, may be also used instead of the pressure roller B.

Like the pressure roller B, if the pressure part B' is gradually moved inside the ring housing 16 along the shape of the spline groove 27b and then arrived at the shallow portion (thread) of the spline groove 27a, the pressure part B' selectively presses the first and second pawls 12 and 13 while being maximally moved into the ring housing 16, and if the pressure part B' is arrived at the deep portion (valley) of the spline groove 27a, the pressure part B' is rotated by the elastic force of the coil spring and protruded inside or outside the ring housing 16.

Figure 20:
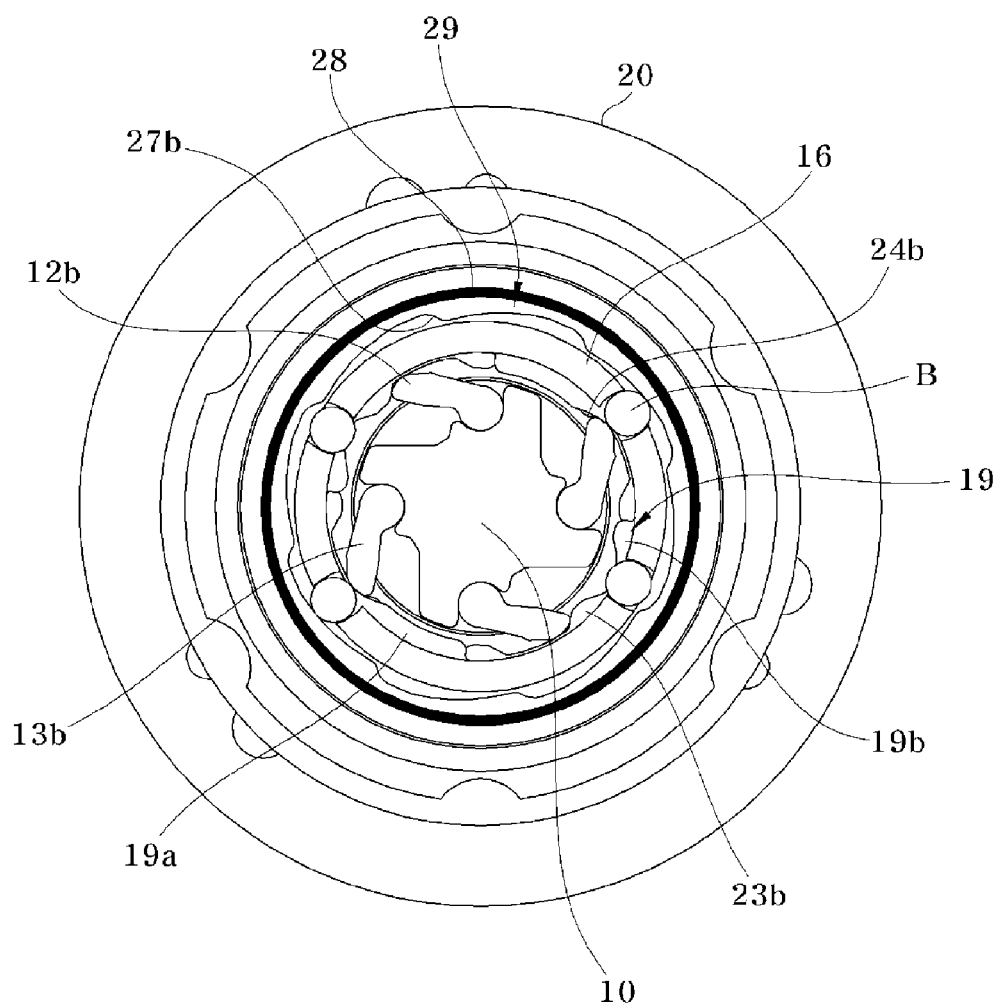
FIG. 20 is a cross-sectional view of the spline groove according to another embodiment of the present invention.

Furthermore, in the first and second embodiments, it is described that the spline groove 27a is integrally formed inside the carrier 20. As another embodiment, as shown in FIGS. 12A, 12B and 20, a spline groove body 29 having the spline groove 27 may be further provided in the carrier 20 so as to be rotated while being contacted with the inner circumference of the carrier 20.

In case that the spline groove 27 is integrally formed at the inner circumference of the carrier 20, the number of rotation of the spline groove 27 is the same as the number of rotation of the carrier 20. If the bicycle is driven without the speed changing, the pressure member of the pawl controlling ring 15 may be not influenced by the spline groove 27, even through the carrier 20 is rotated at a high speed. But if the pawl controlling ring 15 is rotated by the shifting operation, the pressure member is influenced by the spline groove 27 while being pushed outside the pawl controlling ring 15 by the first and second pawls 12 and 13. Therefore, if it is suddenly shifted while the bicycle is driven at a high speed, the rotational force is excessively transferred to the pressure member and the pawl controlling ring 15, and thus the forced speed changing apparatus of bicycle may be damaged.

Accordingly, the spline groove body 29 having the spline groove 27 is provided separately from the carrier 20 so that only proper rotation force can be transferred to the pawl controlling ring 15 by frictional force between the spline groove body 29 and the carrier 20. Thus, it is prevented by slipping therebetween that the excessive rotational force is transferred to the pawl controlling ring 15, thereby protecting the speed changing apparatus of bicycle.

Herein, the magnitude of rotational force to be transferred can be set by using the frictional force between materials of the spline groove body 29 and the carrier 20 which are contacted to each other and rotated together. A transferring member 28 which is disposed between the spline groove body 29 and the carrier 20 so as to be contacted with both of them may be further provided. The transferring member 28 may be formed of a metal material which is different from the materials for the carrier 20 and the spline groove body 29 in consideration of heat-resistance, abrasion resistance, frictional force and the like.

On the other hand, in the present invention, it is described that the pawl controlling ring 15 is provided in the carrier 20, and the pressure member is selectively pressed by the spline grooves 27, 27a and 27b formed at the spline groove body 29 or the inner circumference of the carrier 20, thereby assisting the shifting operation. However, the embodiment is just an example. If the position of the pawl controlling ring 15 is changed, the pawl controlling ring 15 may be disposed in other rotating construction element instead of the carrier 20. In this case, the spline groove is formed at an inner circumference of the rotating construction element.

As described above, in order to solve the problems in the conventional speed changing apparatus, the forced speed changing apparatus of bicycle further includes the pressure member and the spline groove 27 for controlling the movement of the pressure member. Therefore, when it is shifted from a higher gear stage to a lower gear stage, the engagement between the first and second fixing pawls 12a and 13a and the fixing protrusions 23b, 24b is forcibly released, and thus the first and second sagging pawls 12b and 13b are surely controlled by the first and second push protrusions 16a, 16b, 19a ad 19b.

As the result, in order to release the engagement between the fixing pawls 12a and 13a and the fixing protrusions 23b, 24b, it is not necessary to temporarily release the driving force and it is facile to perform the speed changing. Furthermore, since it is possible to shift the gears with small force, it is possible to use a signal line and an electric switch instead of the lever and the wire connected with the lever, thereby remarkably improving the components.

According to the present invention, since it is possible to easily and exactly release the engagement between the pawl and the sun gear using a pressure member, it is possible to provide reliability in the speed changing. Further, since the forced speed changing apparatus of bicycle has a simple structure, it is possible to enhance the assemblage and reduce the manufacturing cost.

Further, since it is not necessary to temporarily release the driving force in order to release the engagement between the pawl and the sun gear and perform the gear shifting, the present invention can be variously applied to an electric bicycle and the like.

In addition, since the present invention can shift the gears with small force, it is possible to use electronic components such as an electric switch instead of the mechanical components, thereby providing the convenience.

While the present invention has been described with respect to the specific embodiments, it will be apparent to those skilled in the art that various changes and modifications may be made without departing from the spirit and scope of the invention as defined in the following claims.

What is claimed is:

1. A forced speed changing apparatus of a bicycle, comprising:
    a hub shaft over which a first pawl and a second pawl are mounted;
    a pawl controlling ring which controls the first and the second pawls;
    a carrier which is disposed outside the pawl controlling ring;
    a first sun gear engageable with the hub shaft by operation of the first pawl;
    a second sun gear engageable with the hub shaft by operation of the second pawl;
    a planetary gear engageable with the first sun gear, the second sun gear, or both; a hub shell which receives the carrier and has a ring gear engageable with the planetary gear;
    a speed changing unit configured to rotate the pawl controlling ring;
    a pressure member disposed at the pawl controlling ring; and
    a spline groove formed at an inner circumference of the carrier,
    wherein the pressure member is movable by rotation of the carrier so as to press the first pawl and to release engagement between the first pawl and the first sun gear, and
    wherein the pressure member is movable by rotation of the carrier so as to press the second pawl and to release engagement between the second pawl and the second sun gear.

2. The apparatus of claim 1, wherein the first pawl is the only first pawl and the second pawl is the only second pawl.

3. The apparatus according to claim 1, wherein the first pawl is one of two first pawls, and
    wherein the second pawl is one of two second pawls.

4. The apparatus of claim 1, wherein the pawl controlling ring includes a mounting hole, and
    wherein the pressure member includes a pressure roller which is received in the mounting hole, and
    wherein the pressure roller is movable inside the pawl controlling ring by the spline groove.

5. The apparatus of claim 1, wherein the pressure member includes a pressure part which is elastically supported by a coil spring, and
    wherein the pressure part is rotationally movable inside the pawl controlling ring by the spline groove.

6. The apparatus of claim 1, wherein the pawl controlling ring comprises (i) a ring housing and (ii) a fixing ring coupled with the ring housing,
    wherein one of the ring housing and the fixing ring has a push protrusion for selectively restricting the first and the second pawls.

7. A forced speed changing apparatus of a bicycle, comprising:
    a hub shaft over which a first pawl and a second pawl are mounted;
    a pawl controlling ring which controls the first and the second pawls;
    a carrier disposed outside the pawl controlling ring;
    first and second sun gears each engageable with the hub shaft by operation of the first and the second pawls, respectively;
    a planetary gear configured to be engageable with the first sun gear, the second sun gear, or both;
    a hub shell which receives the carrier and has a ring gear engageable with the planetary gear;
    a speed changing unit which rotates the pawl controlling ring;
    a pressure member disposed at the pawl controlling ring;
    a spline groove body which is coupled to and rotated together with the carrier; and
    a spline groove formed at an inner circumference of the spline groove body,
    wherein the pressure member is movable so as to press the first pawl and to release engagement between the first pawl and the first sun gear, and
    wherein the pressure member is movable so as to press the second pawl and to release engagement between the second pawl and the second sun gear.

8. The apparatus of claim 7, wherein the first pawl is the only first pawl and the second pawl is the only second pawl.

9. The apparatus according to claim 7, wherein the first pawl is the only first pawl and the second pawl is the only second pawl.

10. The apparatus of claim 7, wherein the apparatus further comprises a transferring member which is disposed between the spline groove body and the carrier.

* * * * *